United States Patent
Shimode

(10) Patent No.: US 12,194,867 B2
(45) Date of Patent: Jan. 14, 2025

(54) VEHICLE CONTROL DEVICE

(71) Applicant: TOYOTA JIDOSHA KABUSHIKI KAISHA, Toyota (JP)

(72) Inventor: Kazumasa Shimode, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 230 days.

(21) Appl. No.: 17/955,761

(22) Filed: Sep. 29, 2022

(65) Prior Publication Data

US 2023/0191913 A1 Jun. 22, 2023

(30) Foreign Application Priority Data

Dec. 16, 2021 (JP) ................................. 2021-203951

(51) Int. Cl.
*B60L 3/10* (2006.01)
*B60L 7/18* (2006.01)

(52) U.S. Cl.
CPC ................. *B60L 3/108* (2013.01); *B60L 7/18* (2013.01); *B60L 2240/14* (2013.01); *B60L 2240/423* (2013.01); *B60L 2240/429* (2013.01)

(58) Field of Classification Search
CPC ........ B60L 3/108; B60L 7/18; B60L 2240/14; B60L 2240/423; B60L 2240/429
See application file for complete search history.

(56) References Cited

U.S. PATENT DOCUMENTS

| 4,697,825 A | * | 10/1987 | Hayashi | B60T 8/52 303/115.6 |
| 4,917,444 A | * | 4/1990 | Ishido | B60T 8/1755 188/112 A |
| 5,005,132 A | * | 4/1991 | Yoshino | B60T 8/1769 303/190 |
| 7,077,484 B2 | * | 7/2006 | Sasaki | B60T 13/662 303/3 |
| 9,796,366 B2 | * | 10/2017 | Korthals | B60T 8/74 |
| 10,046,643 B2 | * | 8/2018 | Nakatsu | B60L 15/2009 |
| 2013/0173099 A1 | * | 7/2013 | Takagi | B60W 30/18127 701/22 |

FOREIGN PATENT DOCUMENTS

JP 2006-117199 A 5/2006

* cited by examiner

*Primary Examiner* — Gertrude Arthur Jeanglaude
(74) *Attorney, Agent, or Firm* — Oliff PLC

(57) ABSTRACT

In a vehicle control device provided in a vehicle including a motor configured to apply a regenerative braking force to a wheel, a braking force controlling portion controls torque of the motor such that the motor generates a regenerative braking force corresponding to a requested braking force requested to the vehicle. When the wheel locks during braking, the braking force controlling portion executes an antilock control in which the torque of the motor is controlled such that the lock of the wheel is restrained. An acquisition portion acquires the deceleration speed of the vehicle. A derivation portion derives an expected deceleration speed for the vehicle based on the requested braking force. In a case where the braking force controlling portion executes the antilock control, the braking force controlling portion controls vibration of the motor based on the difference between the expected deceleration speed and the deceleration speed.

10 Claims, 9 Drawing Sheets

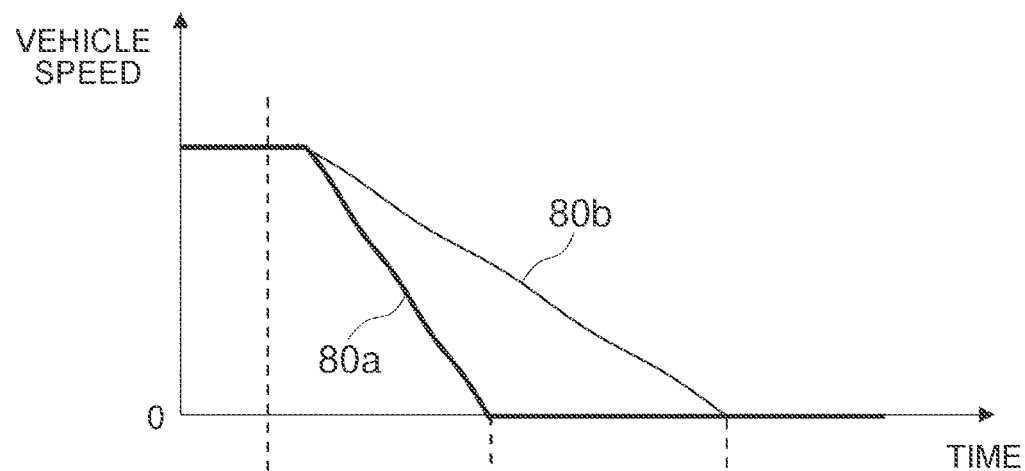
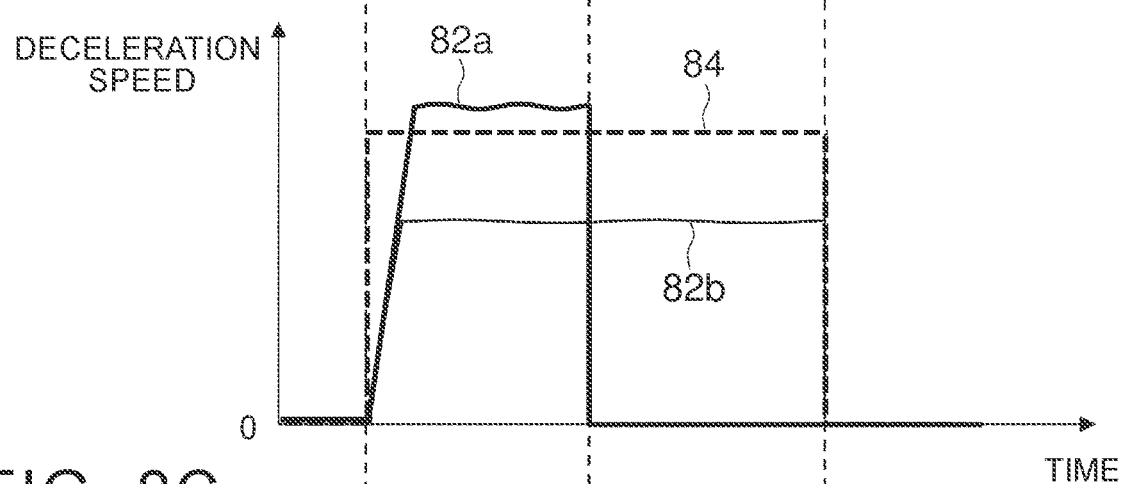
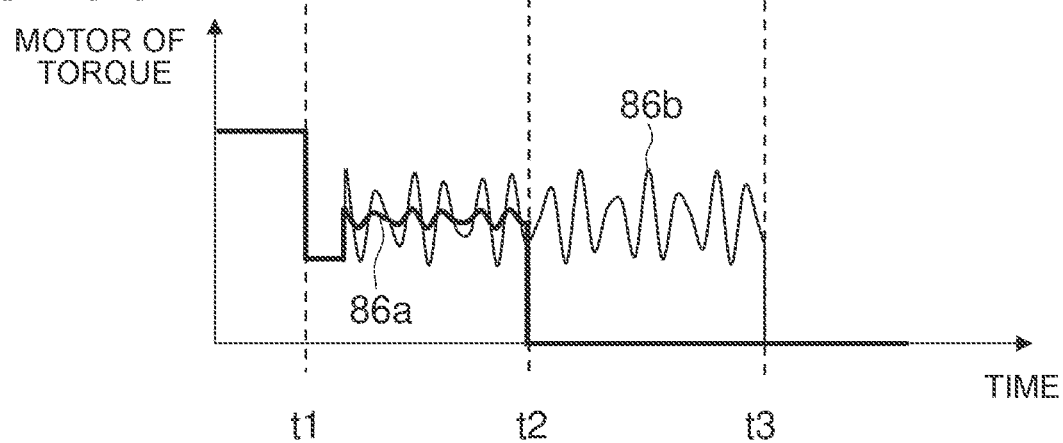

VEHICLE CONTROL DEVICE

CROSS-REFERENCE TO RELATED APPLICATION

This application claims priority to Japanese Patent Application No. 2021-203951 filed on Dec. 16, 2021, incorporated herein by reference in its entirety.

BACKGROUND

1. Technical Field

The present disclosure relates to a vehicle control device for braking a vehicle by a regenerative braking force from a motor.

2. Description of Related Art

There has been known a hydraulic braking device configured such that, when an antilock control is executed, the hydraulic braking device notifies a driver that the antilock control is being executed (see, for example, Japanese Unexamined Patent Application Publication No. 2006-117199 (JP 2006-117199 A)).

SUMMARY

The inventor of the present disclosure recognized the following fact. That is, in a case where the antilock control is executed in a technology to brake a vehicle by a regenerative braking force from a motor, high response or high convergence of the motor, high quietness of the motor, or the like makes it hard to notify a driver that the antilock control is being executed.

An object of the present disclosure is to provide a technology that allows a driver to recognize that an antilock brake system is actuated, in terms of a vehicle control device for braking a vehicle by a regenerative braking force from a motor.

In order to achieve the above object, a vehicle control device according to an aspect of the present disclosure is a vehicle control device provided in a vehicle including a motor configured to apply a regenerative braking force to a wheel. The vehicle control device includes a braking force controlling portion, an acquisition portion, and a derivation portion. The braking force controlling portion is configured to control torque of the motor such that the motor generates a regenerative braking force corresponding to a requested braking force requested to the vehicle, the braking force controlling portion configured to, when the wheel locks during braking, execute an antilock control in which the torque of the motor is controlled such that the lock of the wheel is restrained. The acquisition portion is configured to acquire a deceleration speed of the vehicle. The derivation portion is configured to derive an expected deceleration speed for the vehicle based on the requested braking force. In a case where the braking force controlling portion executes the antilock control, the braking force controlling portion controls vibration of the motor based on a difference between the expected deceleration speed and the deceleration speed.

With the present disclosure, in a vehicle control device for braking a vehicle by a regenerative braking force from a motor, a driver can recognize that an antilock brake system works.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8A is a view illustrating changes in vehicle speed over time during an antilock control on a vehicle in the second embodiment FIG. 8B is a view illustrating respective changes in expected deceleration speed and deceleration speed over time during the antilock control in the second embodiment;

FIG. 8C is a view illustrating changes in the torque of a motor during the antilock control on the vehicle in the second embodiment;

DETAILED DESCRIPTION OF EMBODIMENTS

First Embodiment

Figure 1:
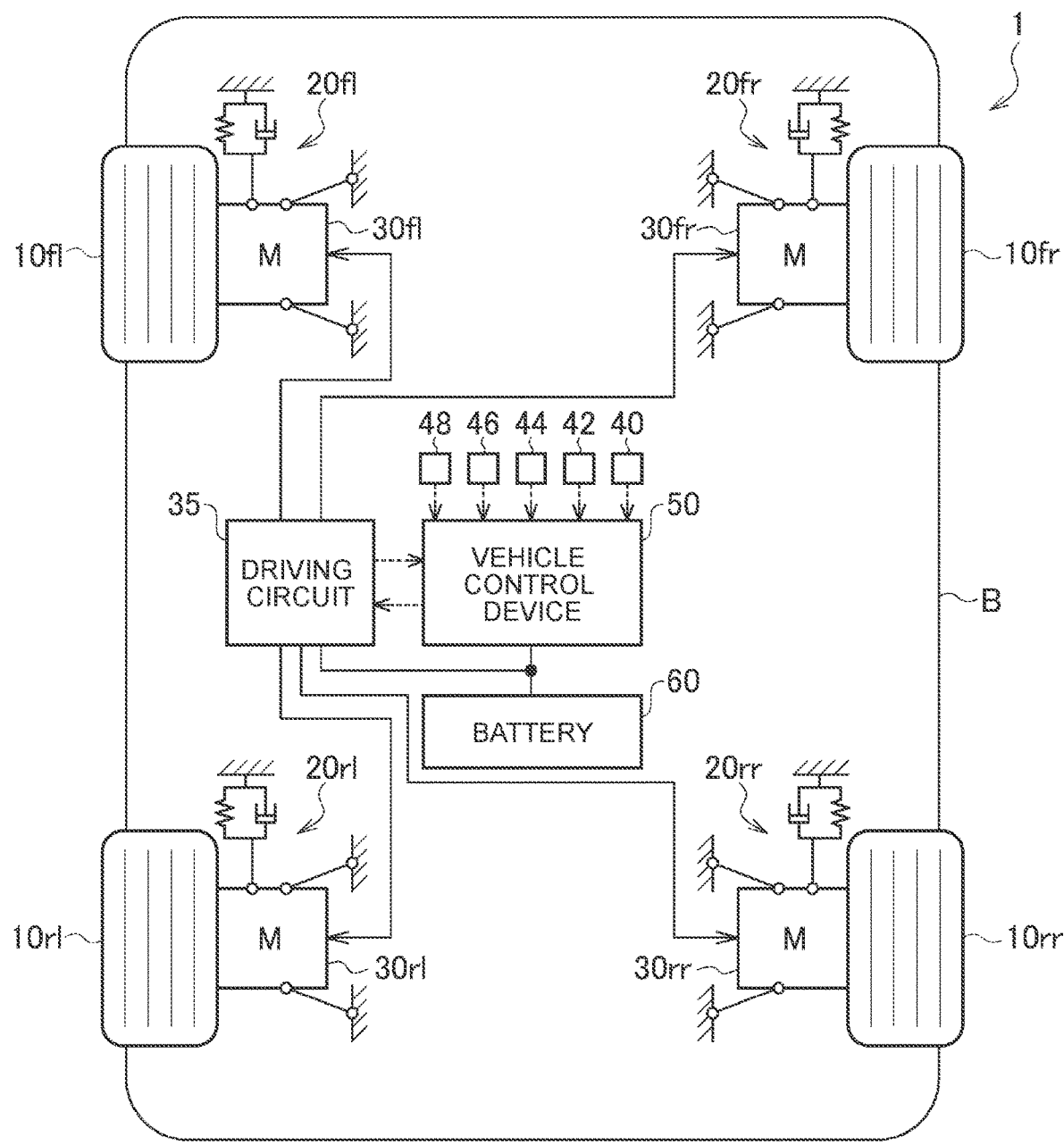
FIG. 1 is a view diagrammatically illustrating a configuration of a vehicle provided with a vehicle control device in a first embodiment.

FIG. 1 diagrammatically illustrates a configuration of a vehicle 1 provided with a vehicle control device 50 according to a first embodiment. The vehicle 1 includes a front-left wheel 10$fl$, a front-right wheel 10$fr$, a rear-left wheel 10$rl$, and a rear-right wheel 10$rr$. Motors 30$fl$, 30$fr$, 30$rl$, 30$rr$ are incorporated inside the wheels 10$fl$, 10$fr$, 10$rl$, 10$rr$, respectively. The vehicle 1 is an electrified vehicle.

The motors 30$fl$, 30$fr$, 30$rl$, 30$rr$ are so-called in-wheel type motors. The motors 30$fl$, 30$fr$, 30$rl$, 30$rr$ are placed under respective springs in the vehicle 1 together with the wheels 10$fl$, 10$fr$, 10$rl$, 10$rr$, respectively, and connected thereto such that motor torque is transmittable to the wheels 10$fl$, 10$fr$, 10$rl$, 10$rr$. In the vehicle 1, respective rotations of the motors 30*fl*, 30*fr*, 30*r*1, 30*rr* are independently controlled, so that respective driving forces and respective braking forces to be generated for the wheels 10*fl*, 10*fr*, 10*rl*, 10*rr* can be controlled independently.

The wheels 10*fl*, 10*fr*, 10*rl*, 10*rr* are suspended from a vehicle body B by independent suspensions 20*fl*, 20*fr*, 20*r*1, 20*rr*, respectively, via respective casings of the motors 30*fl*, 30*fr*, 30*r*1, 30*rr*. The suspensions 20*fl*, 20*fr*, 20*r*1, 20*rr* are connecting mechanisms via which the vehicle body B is connected to the wheels 10*fl*, 10*fr*, 10*rl*, 10*rr*.

Hereinafter, when it is not necessary to specify any given one of the wheels 10*fl*, 10*fr*, 10*rl*, 10*rr*, any given one of the suspensions 20*fl*, 20*fr*, 20*r*1, 20*rr*, and any given one of the motors 30*fl*, 30*fr*, 30*r*1, 30*rr*, they are referred to as the wheel 10, the suspension 20, and the motor 30, respectively.

The motors 30 are, for example, three-phase alternating current synchronous motors. The motors 30 are connected to a driving circuit 35. The driving circuit 35 includes a plurality of switching elements (not illustrated) and drives the motors 30 by switching operations of the switching elements. The driving circuit 35 can be configured by a well-known technology. The driving circuit 35 includes, for example, four three-phase inverters corresponding to respective motors 30 and is configured to convert direct-current power supplied from a battery 60 into alternating current power and supply the alternating current power to the respective motors 30 independently. Hereby, the motors 30 are drivingly controlled such that the motors 30 generate torque and give driving forces to the wheels 10.

The motors 30 also function as generators and can generate electric power by rotational energy from the wheels 10 and regenerate the generated electric power to the battery 60 via the driving circuit 35. The torque to be generated by the power generation by the motors 30 gives a regenerative braking force to the wheels 10. Note that the wheel 10 may be provided with a friction brake device, but the friction brake device is not illustrated and described herein.

An accelerator sensor 40 detects the accelerator operation amount of a driver from the depression amount of an accelerator pedal and supplies the accelerator operation amount to the vehicle control device 50. A brake sensor 42 detects the brake operation amount of the driver from the depression amount of a brake pedal and supplies the depression amount to the vehicle control device 50.

A wheel speed sensor 44 detects a wheel speed that is the rotation speed of the wheel 10 and supplies the wheel speed to the vehicle control device 50. A rotation number sensor 46 detects the rotation number of the motor 30 and supplies the rotation number to the vehicle control device 50. The current sensor 48 detects a current flowing through the motor 30 and supplies a detected current value to the vehicle control device 50.

The vehicle control device 50 sets a requested individual wheel driving force or a requested individual wheel braking force of the wheel 10 based on a corresponding one of the detected accelerator operation amount and the detected brake operation amount. For example, based on a braking-driving force map set in advance, the vehicle control device 50 sets a requested driving force that increases as the accelerator operation amount is larger or sets a requested braking force that increases as the brake operation amount is larger. The vehicle control device 50 sets the requested individual wheel driving force or the requested individual wheel braking force of each of the wheels 10 by distributing the requested driving force or the requested braking force to the four wheels at a predetermined distribution ratio.

The vehicle control device 50 calculates a target driving torque corresponding to the requested individual wheel driving force or a target regenerative brake torque corresponding to the requested individual wheel braking force and controls the driving circuit 35 such that the motor 30 generates the target driving torque or the target regenerative brake torque. The vehicle control device 50 applies a pulse signal to the switching elements of the driving circuit 35 such that the switching elements perform respective switching operations, for example, and by controlling the pulse width of the pulse signal, the vehicle control device 50 controls a current flowing to the motor 30 from the battery 60 or a current of regenerative electric power from the motor 30 to the battery 60. Hereby, in the wheel 10, a driving force corresponding to the requested individual wheel driving force or a regenerative braking force corresponding to the requested individual wheel braking force is generated.

Figure 2:
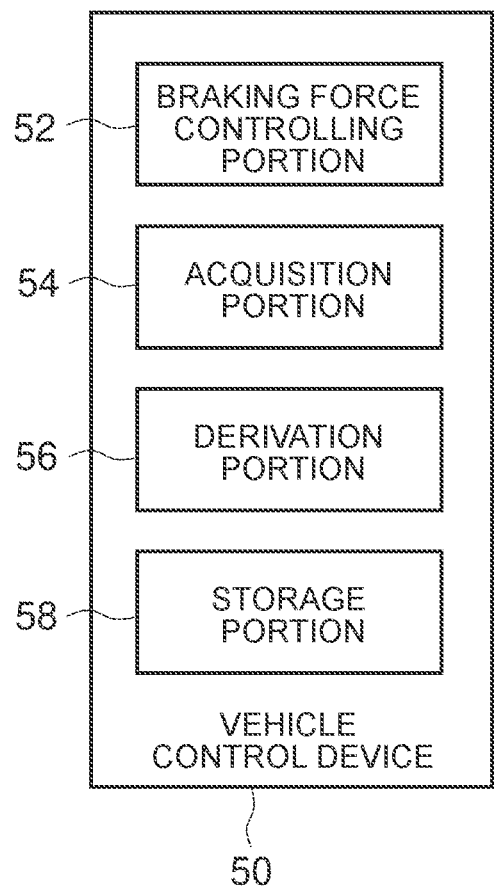
FIG. 2 is a view illustrating a functional configuration of the vehicle control device in FIG. 1.

A braking control will be described more specifically. FIG. 2 illustrates a functional configuration of the vehicle control device 50 in FIG. 1. The vehicle control device 50 includes a braking force controlling portion 52, an acquisition portion 54, a derivation portion 56, and a storage portion 58. The configuration of the vehicle control device 50 can be achieved by a CPU, a memory, and other LSI of a given computer in terms of hardware or can be achieved by a program or the like loaded in the memory in terms of software. Here, functional blocks achieved in combination of them are drawn. Accordingly, it is understood by a person skilled in the art that these functional blocks can be achieved in various forms only by hardware, only by software, or in combination of hardware and software.

The vehicle control device 50 can be constituted by a plurality of ECUs such as a motor ECU configured to execute a control on the motor 30, and a braking ECU configured to execute a braking control and an antilock control, for example. In FIG. 2, functional blocks that are irrelevant to the braking control are not illustrated and described.

As has been already described, the braking force controlling portion 52 controls the torque of the motor 30 such that the motor 30 generates a regenerative braking force corresponding to a requested braking force requested to the vehicle 1. In a case where the wheel 10 locks during braking of the vehicle 1, the braking force controlling portion 52 executes the antilock control in which the torque of the motor 30 is controlled such that the lock of the wheel 10 is restrained. A well-known technology can be used for the antilock control.

An example of the antilock control will be described. The braking force controlling portion 52 repeatedly calculates respective slip ratios of the wheels 10 at a predetermined calculation cycle by comparing the vehicle-body speed with each of the wheel speeds of the four wheels that are detected by the wheel speed sensor 44. When the slip ratio of a given wheel 10 exceeds an ABS start determination threshold, the braking force controlling portion 52 determines that the wheel 10 locks, and the braking force controlling portion 52 starts the antilock control on the wheel 10 determined to lock as a target. The braking force controlling portion 52 derives the vehicle-body speed based on the wheel speeds of the four wheels, for example. The slip ratio is found by (vehicle-body speed−wheel speed)/vehicle-body speed×100%.

In a case where the braking force controlling portion 52 starts the antilock control, the braking force controlling portion 52 acquires a target slip ratio from a predetermined table stored in advance. The target slip ratio is a slip ratio at which the braking force of the wheel 10 is maximum.

The braking force controlling portion 52 derives a target rotation number for the motor 30 that achieves the acquired target slip ratio. The braking force controlling portion 52 executes a PID control on the torque of the motor 30 such that the rotation number of the motor 30 that is detected by the rotation number sensor 46 follows the derived target rotation number. More specifically, the braking force controlling portion 52 derives a current command value to control the torque of the motor 30 such that the rotation number of the motor 30 nears the target rotation number, and the braking force controlling portion 52 controls the driving circuit 35 such that the current value detected by the current sensor 48 nears the current command value.

In the antilock control based on the regenerative braking force of the motor 30, it is possible to shorten a braking distance by high response or high convergence of the motor 30 in comparison with an antilock control to be executed by a friction brake device.

The acquisition portion 54 acquires the deceleration speed of the vehicle 1 and supplies the deceleration speed to the braking force controlling portion 52. The acquisition portion 54 derives the deceleration speed of the vehicle 1 based on a vehicle-body speed, for example.

The derivation portion 56 derives an expected deceleration speed for the vehicle 1 based on a requested braking force and supplies the expected deceleration speed to the braking force controlling portion 52. The expected deceleration speed is larger as the requested braking force is larger. The expected deceleration speed is a deceleration speed of the vehicle 1 that is expected based on the brake operation amount.

In the storage portion 58, a map indicative of the corresponding relationship between a PID constant used for a PID control in the antilock control and the difference between the expected deceleration speed and the deceleration speed of the vehicle 1 is stored in advance. The PID constant corresponds to a control constant by which a feedback control is performed on the torque of the motor 30. The difference between the expected deceleration speed and the deceleration speed is a value obtained by subtracting the deceleration speed from the expected deceleration speed and can be also referred to as a deviation amount between the expected deceleration speed and the deceleration speed.

Figure 3:
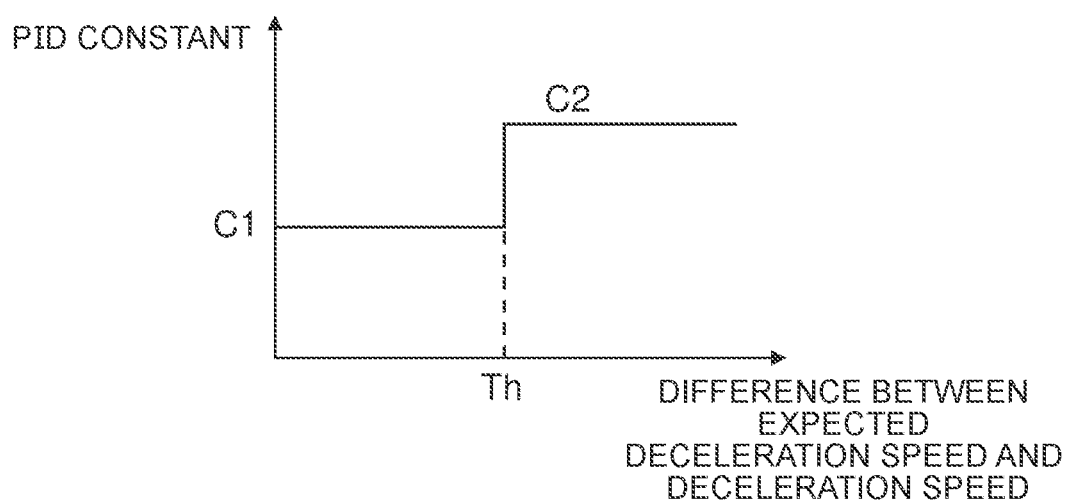
FIG. 3 is a view illustrating an example of a map stored in a storage portion in FIG. 2.

FIG. 3 illustrates an example of the map stored in the storage portion 58 in FIG. 2. A constant C1 is associated with a difference between the expected deceleration speed and the deceleration speed, the difference being smaller than a predetermined threshold Th. A constant C2 is associated with a difference between the expected deceleration speed and the deceleration speed, the difference being equal to or more than the predetermined threshold Th.

The frequency or the amplitude of the torque ripple of the motor 30 during the antilock control is determined in accordance with the PID constant. On that account, the frequency or the amplitude of the torque ripple can be changed by changing the PID constant. The PID constant included in the map includes at least one of a proportional band, a derivative time, and an integral time. The constants C1, C2 and the threshold Th can be defined appropriately by experiment or simulation.

Figure 4:
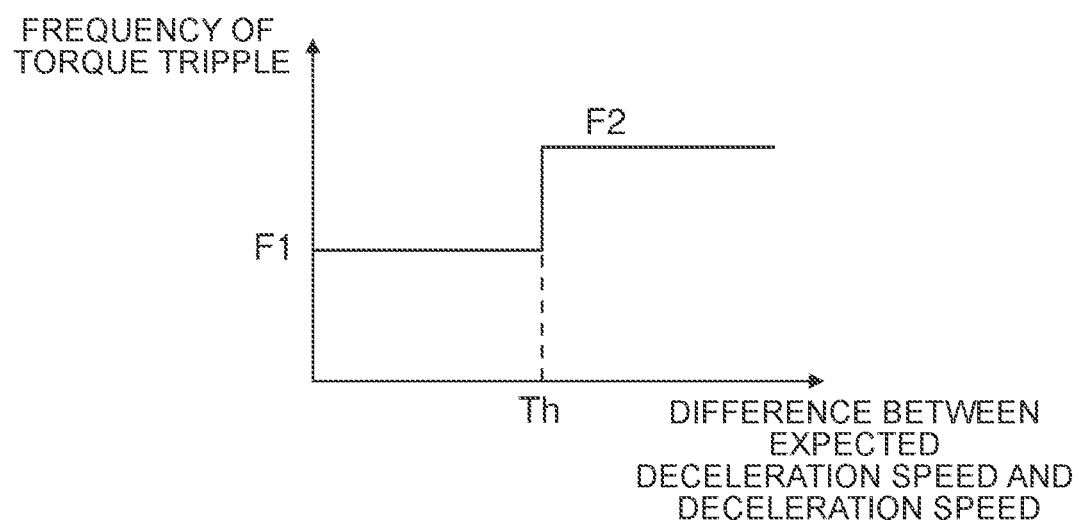
FIG. 4 is a view illustrating an example of the relationship of the frequency of torque ripple in the vehicle of FIG. 1 with the difference between expected deceleration speed and deceleration speed.

FIG. 4 illustrates an example of the relationship of the frequency of the torque ripple in the vehicle 1 of FIG. 1 with the difference between the expected deceleration speed and the deceleration speed. A frequency F1 of the torque ripple in a case where the difference between the expected deceleration speed and the deceleration speed is smaller than the threshold Th is lower than a frequency F2 of the torque ripple in a case where the difference is equal to or more than the threshold Th. The constant C1 is determined in advance such that the frequency F1 is different from the resonance frequency of the vehicle 1. The constant C2 is determined in advance such that the frequency F2 is equivalent to the resonance frequency of the vehicle 1. The resonance frequency of the vehicle 1 may have some frequency width. The frequency F1 may be higher than the frequency F2.

In a case where the braking force controlling portion 52 executes the antilock control, the braking force controlling portion 52 controls the vibration of the motor 30 in accordance with the difference between the expected deceleration speed and the deceleration speed. More specifically, the braking force controlling portion 52 controls the vibration of the motor 30 such that the vibration is larger as the difference between expected deceleration speed and deceleration speed is larger.

In a case where the braking force controlling portion 52 executes the antilock control, the braking force controlling portion 52 derives a difference between the expected deceleration speed and the deceleration speed and determines a PID constant corresponding to the derived difference derived by referring to the map stored in the storage portion 58. A PID constant not included in the map among the proportional band, the derivative time, and the integral time is set to a predetermined value without depending on the derived difference.

That is, in a case where the braking force controlling portion 52 executes the antilock control, when the difference between the expected deceleration speed and the deceleration speed is equal to or more than the threshold Th, the braking force controlling portion 52 determines the PID constant such that the frequency of the torque ripple of the motor 30 is equivalent to the resonance frequency of the vehicle 1.

In a case where the braking force controlling portion 52 executes the antilock control, when the difference between the expected deceleration speed and the deceleration speed is less than the threshold Th, the braking force controlling portion 52 determines the PID constant such that the frequency of the torque ripple of the motor 30 is different from the resonance frequency of the vehicle 1.

Figure 5A:
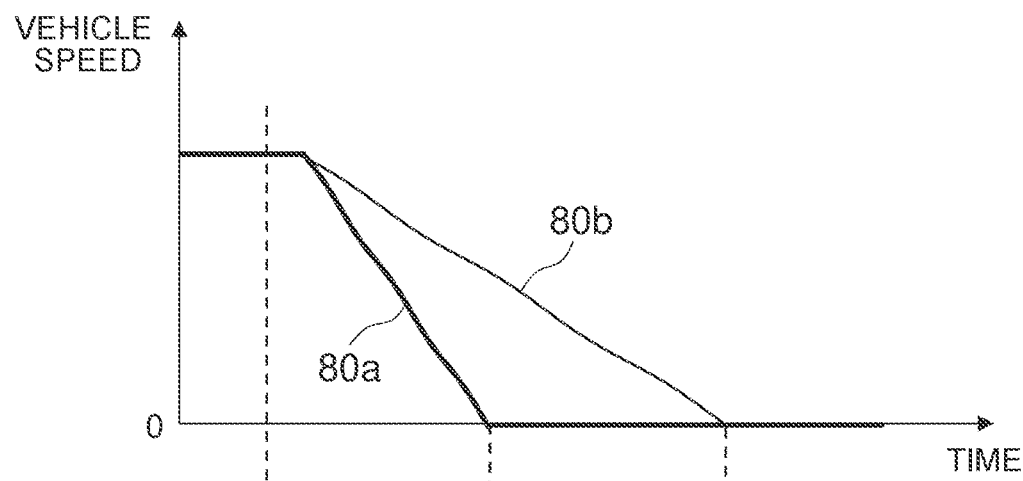
FIG. 5A is a view illustrating changes in vehicle speed over time during an antilock control on the vehicle in FIG. 1.
Figure 5B:
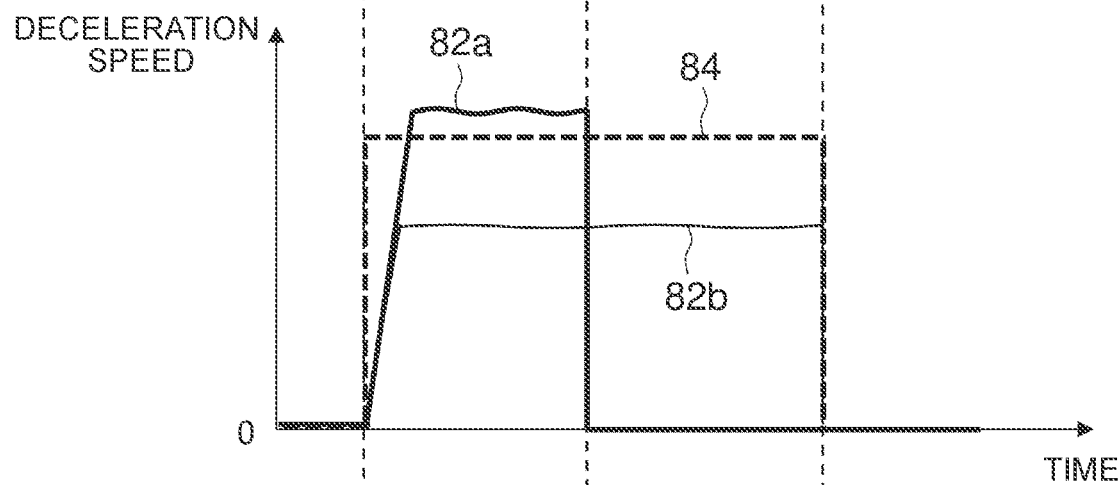
FIG. 5B is a view illustrating respective changes in expected deceleration speed and deceleration speed over time and corresponds to FIG. 5A.
Figure 5C:
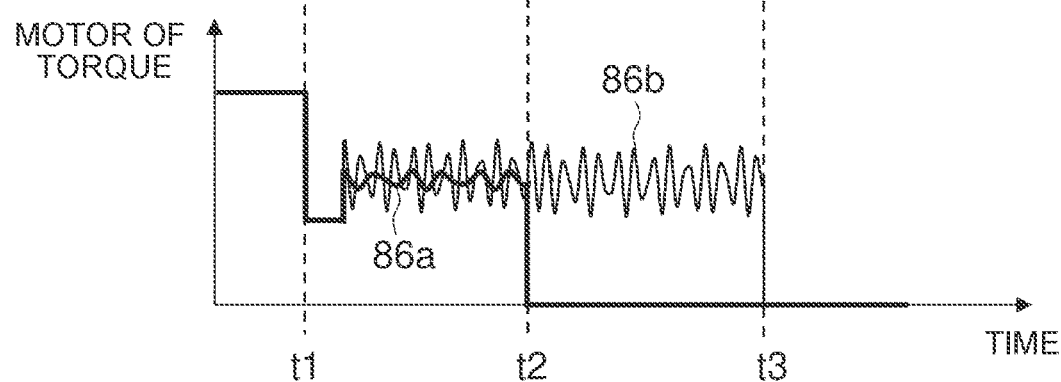
FIG. 5C is a view illustrating changes in the torque of a motor and corresponds to FIG. 5A.

FIG. 5A illustrates changes in vehicle speed over time during the antilock control on the vehicle 1 in FIG. 1. FIG. 5B illustrates respective changes in the expected deceleration speed and the deceleration speed over time and corresponds to FIG. 5A. FIG. 5C illustrates changes in the torque of the motor 30 and corresponds to FIG. 5A.

FIGS. 5A to 5C illustrate a vehicle speed 80a, a deceleration speed 82a, and a torque 86a in a low μ road such as a compacted snow road and a vehicle speed 80b, a deceleration speed 82b, and a torque 86b in an extremely low μ road such as an ice road.

When a brake pedal is stepped at time t1 during running of the vehicle 1, an expected deceleration speed 84 has a value corresponding to the operation amount of the brake pedal as illustrated in FIG. 5B, and the torque 86a, 86b is controlled as illustrated in FIG. 5C, so that the motor 30 generates a regenerative braking force.

The following describes the low μ road. After time t1, the wheel 10 skidded, so that the antilock control is started, and the torque 86a of the motor 30 is controlled such that the lock of the wheel 10 is restrained and the regenerative braking force works as illustrated in FIG. 5C. At this time, as illustrated in FIG. 5B, the deceleration speed 82a is relatively close to the expected deceleration speed 84, and the difference between the expected deceleration speed 84 and the deceleration speed 82a is smaller than a threshold. On this account, the constant C1 is selected, and the frequency of the torque ripple is different from the resonance frequency of the vehicle 1. Accordingly, the vibration of the main body of the motor 30 is relatively small, and the sound inside the vehicle is also small. In this case, the expected deceleration speed 84 and the actual deceleration speed 82a are relatively close to each other. Accordingly, even when the driver does not recognize that the antilock control is being executed, the driver is less likely to feel uneasy. The vehicle 1 stops at time t2.

Next will be described the extremely low μ road. After time t1, the wheel 10 skidded, so that the antilock control is started, and the torque 86b of the motor 30 is controlled such that the lock of the wheel 10 is restrained and the regenerative braking force works as illustrated in FIG. 5C. At this time, as illustrated in FIG. 5B, the deceleration speed 82b is smaller than the expected deceleration speed 84, and the difference between the expected deceleration speed 84 and the deceleration speed 82b is equal to or more than the threshold. On this account, the constant C2 is selected, and the frequency of the torque ripple becomes generally equal to the resonance frequency of the vehicle 1. Accordingly, the vibration of the main body of the motor 30 becomes relatively large, and the sound inside the vehicle that is caused when the vibration is transmitted to a vehicle cabin also becomes large. Due to the vibration and the sound inside the vehicle, the driver can recognize that the antilock control is executed, and even when the actual deceleration speed 82a is smaller than the expected deceleration speed 84 by the threshold Th or more, the driver is hard to feel uneasy. The vehicle 1 stops at time t3 after time t2.

In the meantime, in a comparative example in which the fixed constant C1 is set as the PID constant without executing the control in the embodiment, in the case of the extremely low μ road, the vibration of the motor is small, and the sound inside the vehicle is also small, so that the driver is hard to recognize that the antilock control is executed. Since the actual deceleration speed is smaller than the expected deceleration speed by the threshold Th or more, the driver may feel uneasy about whether the brake works or not.

Figure 6:
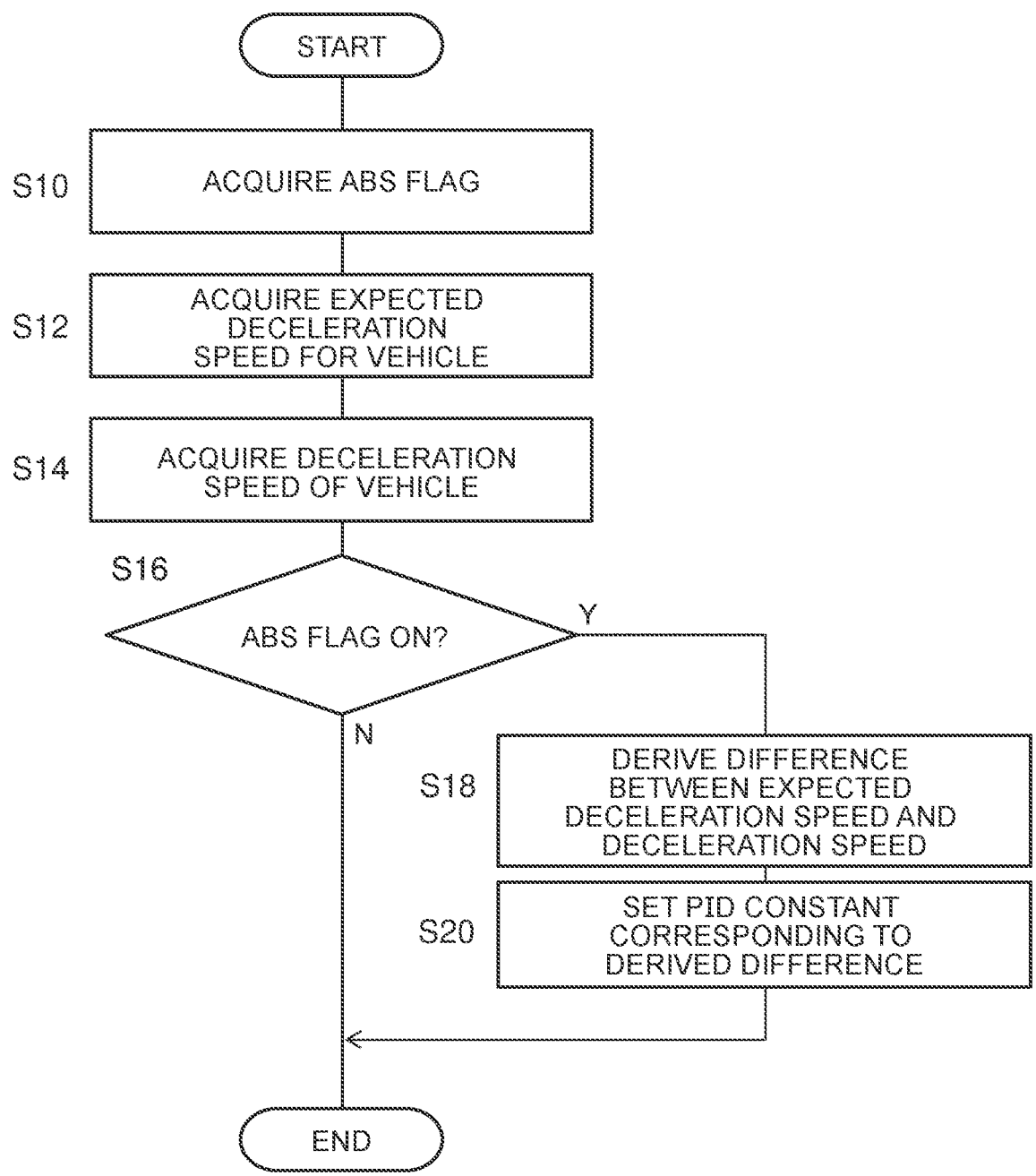
FIG. 6 is a flowchart illustrating a process related to a vibration control on the motor in the vehicle control device illustrated in FIG. 1.

FIG. 6 is a flowchart illustrating a process of a vibration control on the motor 30 in the vehicle control device 50 in FIG. 1. The process of FIG. 6 is repeated regularly. The braking force controlling portion 52 acquires an ABS flag indicative of whether or not the antilock control is being executed (S10). The derivation portion 56 acquires the expected deceleration speed for the vehicle 1 (S12). The acquisition portion 54 acquires the deceleration speed of the vehicle 1 (S14).

When the ABS flag is ON indicating that the antilock control is being executed (Y in S16), the braking force controlling portion 52 derives a difference between the expected deceleration speed acquired in S12 and the deceleration speed acquired in S14 (S18), and the braking force controlling portion 52 sets a PID constant corresponding to the derived difference (S20). Here, the braking force controlling portion 52 ends the process. When the ABS flag is OFF indicating that the antilock control is not being executed (N in S16), the braking force controlling portion 52 ends the process.

In the embodiment, in a case where the braking force controlling portion 52 executes the antilock control, the braking force controlling portion 52 controls the vibration of the motor 30 based on the difference between the expected deceleration speed and the actual deceleration speed of the vehicle 1. Accordingly, the driver can recognize that the antilock brake system works, by the vibration of the motor 30 that corresponds to the skid amount of the wheel 10.

Further, in a case where the difference between the expected deceleration speed and the deceleration speed is large, the vibration of the motor 30 can be made large, and the sound caused by the vibration inside the vehicle can be made large. In a case where the difference between the expected deceleration speed and the deceleration speed is small, the vibration of the motor 30 can be made small, and the sound caused by the vibration inside the vehicle can be made small. As the difference between the expected deceleration speed and the deceleration speed is larger, the vibration of the motor 30 is controlled such that the vibration is made larger. Accordingly, the driver can recognize that the antilock brake system works, only when needed.

Further, the in-wheel type motor is used. Accordingly, in comparison with a configuration in which a motor provided in the main body of the vehicle 1 via a motor mount is connected to the wheel via a drive shaft, the vibration of the motor 30 is easily transmitted to the vehicle cabin via the suspension 20, so that the driver can easily recognize that the antilock brake system works.

Second Embodiment

A second embodiment is different from the first embodiment in that, without changing the PID constant from the constant C1, the resolution of the current sensor is changed in accordance with the difference between the expected deceleration speed and the deceleration speed. The following describes points different from the first embodiment.

In a case where the braking force controlling portion 52 executes the antilock control, the braking force controlling portion 52 increases the amplitude of the torque ripple of the motor 30 as the difference between the expected deceleration speed and the deceleration speed is larger. More specifically, in a case where the braking force controlling portion 52 executes the antilock control, the braking force controlling portion 52 decreases the resolution of the current sensor 48 as the difference between the expected deceleration speed and the deceleration speed is larger. As the resolution of the current sensor 48 is lower, the amplitude of the torque ripple is larger. A well-known technology can be employed to change the resolution of the current sensor 48.

Figure 7:
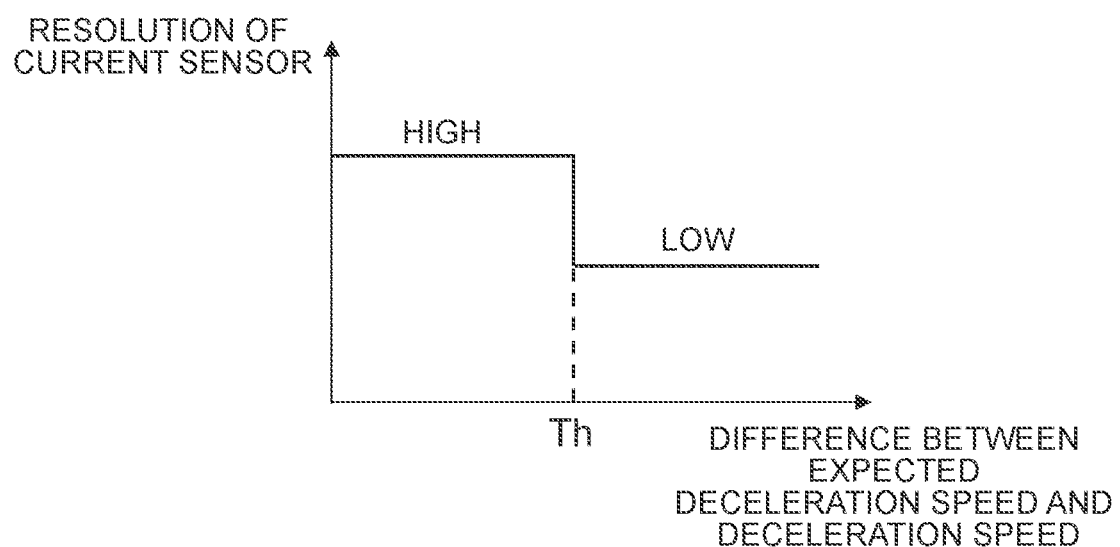
FIG. 7 is a view illustrating an example of a map stored in a storage portion in a second embodiment.

FIG. 7 illustrates an example of a map stored in the storage portion 58 according to the second embodiment. In the storage portion 58, a map indicative of the corresponding relationship of the resolution of the current sensor 48 with the difference between the expected deceleration speed and the deceleration speed of the vehicle 1 is stored in advance. Information indicative of a high resolution is associated with a difference between the expected deceleration speed and the deceleration speed, the difference being smaller than the threshold Th. Information indicating a low resolution is associated with a difference between the expected deceleration speed and the deceleration speed, the difference being equal to or more than the predetermined threshold Th.

In a case where the braking force controlling portion 52 executes the antilock control, the braking force controlling portion 52 derives a difference between the expected deceleration speed and the deceleration speed and determines a resolution corresponding to the derived resolution derived by referring to the map stored in the storage portion 58. That is, in S20 in the flowchart of FIG. 6, the braking force controlling portion 52 sets a resolution corresponding to the derived difference.

In the example of FIG. 7, in a case where the braking force controlling portion 52 executes the antilock control, when the difference between the expected deceleration speed and the deceleration speed is equal to or more than the threshold Th, the braking force controlling portion 52 determines to set the low resolution, and when the difference between the expected deceleration speed and the deceleration speed is less than the threshold Th, the braking force controlling portion 52 determines to set the high resolution. Note that, in the first embodiment, during the antilock control, the resolution of the current sensor 48 is set to the high resolution.

FIGS. 8A to 8C illustrate changes over time in vehicle speeds 80a, 80b, an expected deceleration speed 84, and deceleration speeds 82a, 82b of the vehicle 1 and torques 86a, 86b of the motor 30 during the antilock control in the second embodiment. FIGS. 8A to 8C correspond to FIGS. 5A to 5C.

The vehicle speed 80a, the deceleration speed 82a, and the torque 86a in the low μ road are the same as those in the first embodiment. In the extremely low μ road, the amplitude of the ripple of the torque 86b of the motor 30 is larger than the amplitude of the ripple of the torque 86a.

Thus, in a case where the difference between the expected deceleration speed and the deceleration speed is large, the current sensor 48 is changed to the low resolution such that the amplitude of the torque ripple of the motor 30 is made large. Hereby, the vibration of the main body of the motor 30 can be made large, and the sound caused by the vibration inside the vehicle can be made large.

Third Embodiment

A third embodiment is different from the second embodiment in that, during the antilock control, the current advance amount of the motor 30 is changed in accordance with the difference between the expected deceleration speed and the deceleration speed without changing the resolution of the current sensor 48 from the high resolution. The following describes points different from the second embodiment.

In a case where the braking force controlling portion 52 executes the antilock control, the braking force controlling portion 52 increases the current advance amount in the motor 30 as the difference between the expected deceleration speed and the deceleration speed is larger. The braking force controlling portion 52 sets the current advance amount by controlling the driving circuit 35. A well-known technology can be used to set the current advance amount. As the current advance amount is larger, the amplitude of the torque ripple of the motor 30 is larger.

Figure 9:
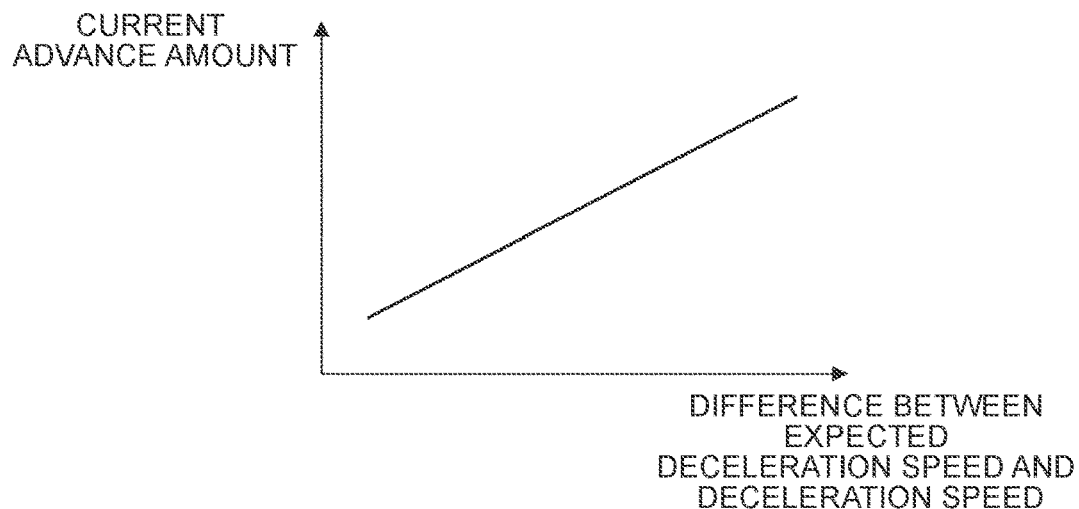
FIG. 9 is a view illustrating an example of a map stored in a storage portion in a third embodiment.

FIG. 9 illustrates an example of a map stored in the storage portion 58 according to the third embodiment. In the storage portion 58, a map indicative of the corresponding relationship of the current advance amount with the difference between the expected deceleration speed and the deceleration speed of the vehicle 1 is stored in advance. As illustrated in FIG. 9, the current advance amount is generally proportional to the difference between the expected deceleration speed and the deceleration speed, and the current advance amount is larger as the difference is larger. Note that the current advance amount may increase in a stepwise manner as the difference between the expected deceleration speed and the deceleration speed is larger.

In a case where the braking force controlling portion 52 executes the antilock control, the braking force controlling portion 52 derives a difference between the expected deceleration speed and the deceleration speed and determines a current advance amount corresponding to the derived different by referring to the map stored in the storage portion 58. That is, in S20 in the flowchart of FIG. 6, the braking force controlling portion 52 sets the current advance amount corresponding to the derived difference.

Hereby, similarly to FIG. 8C, the amplitude of the ripple of the torque 86b of the motor 30 in the extremely low μ road is larger than the amplitude of the ripple of the torque 86a in the low μ road. Hereby, it is possible to obtain the same effect as the second embodiment.

Fourth Embodiment

A fourth embodiment is different from the second embodiment in that, during the antilock control, dead time for the switching elements is changed in accordance with the difference between the expected deceleration speed and the deceleration speed without changing the resolution of the current sensor 48 from the high resolution. The following describes points different from the second embodiment.

In a case where the braking force controlling portion 52 executes the antilock control, the braking force controlling portion 52 lengthens the dead time for the switching elements of the driving circuit 35 as the difference between the expected deceleration speed and the deceleration speed is larger. The dead time is a period during which a high-side switching element and a low-side switching element constituting the inverter of the driving circuit 35 are turned off at the same time. A well-known technology can be used to set the dead time. As the dead time is longer, the amplitude of the torque ripple of the motor 30 is larger.

Figure 10:
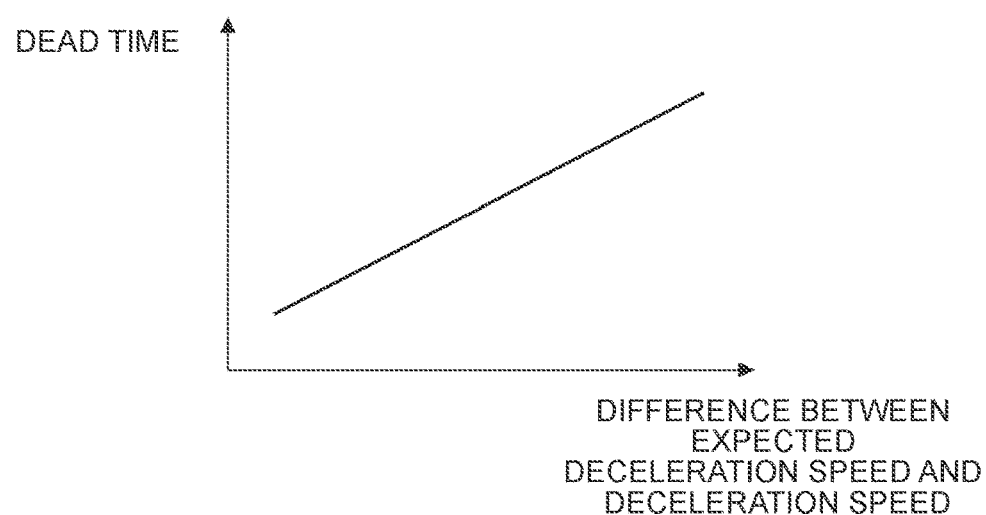
FIG. 10 is a view illustrating an example of a map stored in a storage portion in a fourth embodiment.

FIG. 10 illustrates an example of a map stored in the storage portion 58 according to the fourth embodiment. In the storage portion 58, a map indicative of the corresponding relationship of the dead time with the difference between the expected deceleration speed and the deceleration speed of the vehicle 1 is stored in advance. As illustrated in FIG. 10, the dead time is generally proportional to the difference between the expected deceleration speed and the deceleration speed, and the dead time is larger as the difference is larger. Note that the dead time may increase in a stepwise manner as the difference between the expected deceleration speed and the deceleration speed is larger.

In a case where the braking force controlling portion 52 executes the antilock control, the braking force controlling portion 52 derives a difference between the expected deceleration speed and the deceleration speed and determines dead time corresponding to the derived difference by referring to the map stored in the storage portion 58. That is, in S20 in the flowchart of FIG. 6, the braking force controlling portion 52 sets the dead time corresponding to the derived difference.

Hereby, similarly to FIG. 8C, the amplitude of the ripple of the torque 86b of the motor 30 in the extremely low μ road is larger than the amplitude of the ripple of the torque 86a in the low μ road. Hereby, it is possible to obtain the same effect as the second embodiment.

Fifth Embodiment

A fifth embodiment is different from the second embodiment in that, during the antilock control, a current command value is oscillated in accordance with the difference between the expected deceleration speed and the deceleration speed without changing the resolution of the current sensor 48 from the high resolution. The following describes points different from the second embodiment.

In a case where the braking force controlling portion 52 executes the antilock control, the braking force controlling portion 52 largely oscillates the current command value as the difference between the expected deceleration speed and the deceleration speed is larger. As the oscillation amplitude of the current command value is larger, the amplitude of the torque ripple of the motor 30 is larger.

Figure 11:
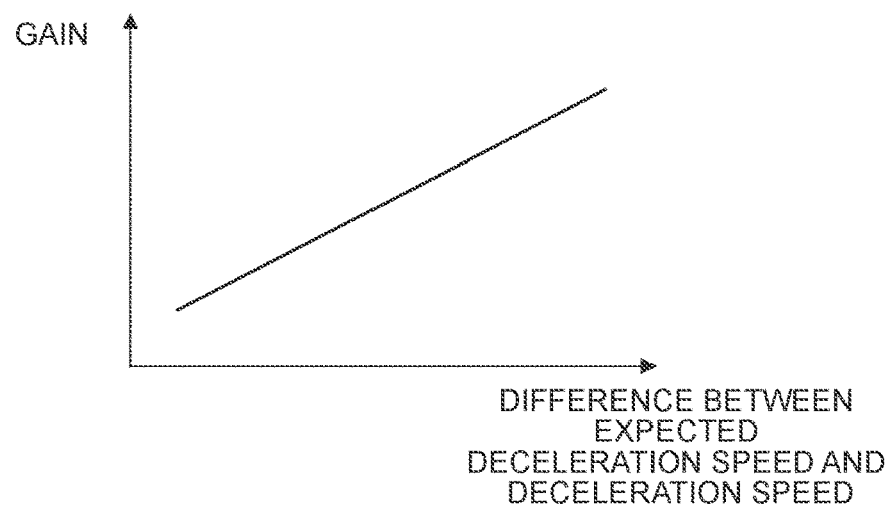
FIG. 11 is a view illustrating an example of a map stored in a storage portion in a fifth embodiment.

FIG. 11 illustrates an example of a map stored in the storage portion 58 according to the fifth embodiment. In the storage portion 58, a map indicative of the corresponding relationship of a gain indicative of the oscillation amplitude of the current command value with the difference between the expected deceleration speed and the deceleration speed of the vehicle 1 is stored in advance. As illustrated in FIG. 11, the gain is generally proportional to the difference between the expected deceleration speed and the deceleration speed, and the gain is larger as the difference is larger. Note that the gain may increase in a stepwise manner as the difference between the expected deceleration speed and the deceleration speed is larger. In a case where the difference between the expected deceleration speed and the deceleration speed is less than the threshold, the gain may be zero.

In a case where the braking force controlling portion 52 executes the antilock control, the braking force controlling portion 52 derives a difference between the expected deceleration speed and the deceleration speed and determines a gain corresponding to the derived difference by referring to the map stored in the storage portion 58. That is, in S20 in the flowchart of FIG. 6, the braking force controlling portion 52 sets the gain corresponding to the derived difference. The braking force controlling portion 52 obtains an oscillating current command value by adding a sine wave with an amplitude corresponding to the determined gain to a reference current command value derived such that the rotation number of the motor 30 nears a target rotation number. The braking force controlling portion 52 causes a time average value of the oscillating current command value to be equal to the reference current command value without depending on the gain. The braking force controlling portion 52 controls the driving circuit 35 such that the current value detected by the current sensor 48 nears the oscillating current command value thus obtained.

Figure 12:
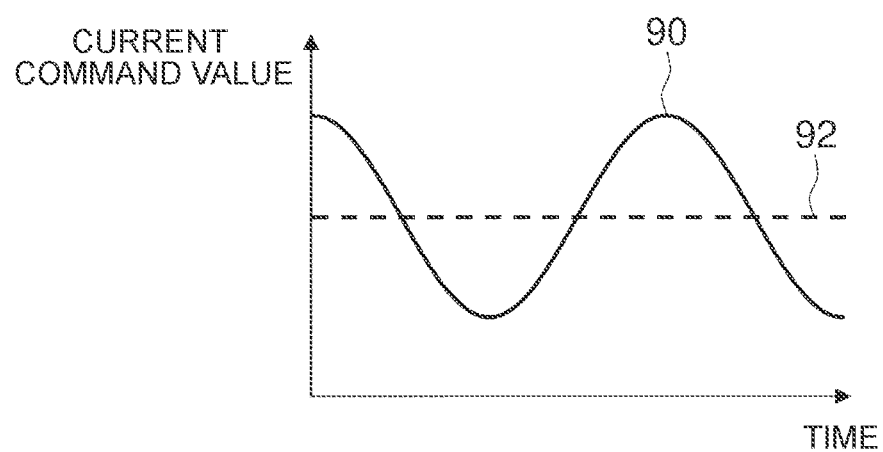
FIG. 12 is a view illustrating changes in current command value over time in a case where the difference between expected deceleration speed and deceleration speed in the fifth embodiment is relatively large.

FIG. 12 illustrates changes in a current command value 90 over time in a case where the difference between the expected deceleration speed and the deceleration speed is relatively large in the fifth embodiment. The current command value 90 has a waveform in which a sine wave is superimposed on a reference current command value 92.

Hereby, similarly to FIG. 8C, the amplitude of the ripple of the torque 86*b* of the motor 30 in the extremely low μ road is larger than the amplitude of the ripple of the torque 86*a* in the low μ road. Hereby, it is possible to obtain the same effect as the second embodiment.

The present disclosure has been described above based on the embodiments. The embodiments are just examples, and it is understood by a person skilled in the art that various modifications can made in terms of combinations of the constituents and the processes and such modifications are also included in the scope of the present disclosure.

For example, the embodiments deal with the in-wheel type motor as an example, but the motor provided in the vehicle body B may be connected to the wheel via a drive shaft.

What is claimed is:

1. A vehicle control device provided in a vehicle including a motor configured to apply a regenerative braking force to a wheel, the vehicle control device comprising:

a braking force controlling portion configured to control torque of the motor such that the motor generates a regenerative braking force corresponding to a requested braking force determined based on a brake operation amount, the braking force controlling portion configured to, when the wheel locks during braking, execute an antilock control in which the torque of the motor is controlled such that the lock of the wheel is restrained;

an acquisition portion configured to acquire a deceleration speed of the vehicle; and a derivation portion configured to derive an expected deceleration speed for the vehicle based on the requested braking force, wherein, in a case where the braking force controlling portion executes the antilock control, the braking force controlling portion controls vibration of the motor based on a difference between the expected deceleration speed and the deceleration speed.

2. The vehicle control device according to claim 1, wherein, in the case where the braking force controlling portion executes the antilock control, the braking force controlling portion controls the vibration of the motor such that the vibration is larger as the difference between the expected deceleration speed and the deceleration speed is larger.

3. The vehicle control device according to claim 1, wherein, in the case where the braking force controlling portion executes the antilock control, when the difference between the expected deceleration speed and the deceleration speed is equal to or more than a predetermined threshold, the braking force controlling portion determines a control parameter to execute a feedback control on the torque of the motor such that frequency of torque ripple of the motor becomes equivalent to resonance frequency of the vehicle.

4. The vehicle control device according to claim 3, wherein, in the case where the braking force controlling portion executes the antilock control, when the difference between the expected deceleration speed and the deceleration speed is less than the threshold, the braking force controlling portion determines the control parameter such that the frequency of the torque ripple of the motor is different from the resonance frequency of the vehicle.

5. The vehicle control device according to claim 1, wherein, in the case where the braking force controlling portion executes the antilock control, the braking force controlling portion increases the amplitude of the torque ripple of the motor as the difference between the expected deceleration speed and the deceleration speed is larger.

6. The vehicle control device according to claim 5, comprising:

a current sensor configured to detect a current flowing through the motor and supply a detected current value to the braking force controlling portion; and a driving circuit configured to drive the motor, wherein:

the braking force controlling portion derives a current command value to control the torque of the motor and controls the driving circuit such that the detected current value nears the current command value; and in the case where the braking force controlling portion executes the antilock control, the braking force controlling portion decreases resolution of the current sensor as the difference between the expected deceleration speed and the deceleration speed is larger.

7. The vehicle control device according to claim 5, wherein, in the case where the braking force controlling portion executes the antilock control, the braking force controlling portion increases a current advance amount in the motor as the difference between the expected deceleration speed and the deceleration speed is larger.

8. The vehicle control device according to claim 5, comprising a driving circuit including a plurality of switching elements, the driving circuit being configured to drive the motor by switching operations of the switching elements, wherein, in the case where the braking force controlling portion executes the antilock control, the braking force controlling portion lengthens dead time for the switching elements of the driving circuit as the difference between the expected deceleration speed and the deceleration speed is larger.

9. The vehicle control device according to claim 5, comprising:
   a current sensor configured to detect a current flowing through the motor and supply a detected current value to the braking force controlling portion; and
   a driving circuit configured to drive the motor, wherein:
   the braking force controlling portion derives a current command value to control the torque of the motor and controls the driving circuit such that the detected current value nears the current command value; and
   in the case where the braking force controlling portion executes the antilock control, the braking force controlling portion oscillates the current command value more largely as the difference between the expected deceleration speed and the deceleration speed is larger.

10. The vehicle control device according to claim 1, wherein the motor is an in-wheel type motor.

* * * * *